United States Patent [19]

Sommerfeld

[11] 4,032,307

[45] June 28, 1977

[54] METHOD AND APPARATUS FOR CLEANING FILTER MEANS

[75] Inventor: George L. Sommerfeld, Minneapolis, Minn.

[73] Assignee: Tennant Company, Minneapolis, Minn.

[22] Filed: Nov. 28, 1975

[21] Appl. No.: 636,160

[52] U.S. Cl. .................................. 55/96; 55/299;
55/304; 55/381; 55/DIG. 3; 15/352
[51] Int. Cl.² ........................................ B01D 46/04
[58] Field of Search ............... 55/13, 96, 288, 292,
55/293, 295, 299, 300, 304, 315, 381, 527,
528, DIG. 16, DIG. 3; 210/384, 388; 15/352

[56] References Cited

UNITED STATES PATENTS

| | | | |
|---|---|---|---|
| 1,030,477 | 6/1912 | Meier | 55/304 |
| 1,341,129 | 5/1920 | Hopkins | 55/304 |
| 1,356,086 | 10/1920 | Plaisted | 55/300 |
| 2,338,504 | 1/1944 | Foster | 55/381 |
| 2,667,233 | 1/1954 | Vedder | 55/304 |
| 2,829,735 | 4/1958 | Kroll | 55/287 |
| 2,937,711 | 5/1960 | Roberts et al. | 55/112 |
| 3,086,341 | 4/1963 | Brandt | 55/112 |
| 3,570,217 | 3/1971 | Stevernagel | 55/300 |
| 3,639,940 | 2/1972 | Carlson et al. | 55/300 |
| 3,759,014 | 9/1973 | Brandt et al. | 55/96 |
| 3,890,125 | 6/1975 | Schoeck | 55/381 |

FOREIGN PATENTS OR APPLICATIONS

| | | | |
|---|---|---|---|
| 458,872 | 8/1949 | Canada | 55/112 |
| 838,231 | 6/1960 | United Kingdom | 210/388 |

OTHER PUBLICATIONS

J. Idris Jones, Plastics In Filtration, Part 1, New Polymers–Filter Cloths of the Future, Mar./Apr. 1970, Filtration & Separation, pp. 160–167.

Primary Examiner—Bernard Nozick
Assistant Examiner—David L. Lacey
Attorney, Agent, or Firm—Orrin M. Haugen

[57] ABSTRACT

A filter assembly for use in dust control apparatus wherein the filter assembly employs filter barrier material suspended between opposed end frame means. In order to remove accumulated solids from the filter, stroking means, such as a cam-cam follower arrangement or a rotary eccentric loading arrangement are operatively coupled to the filter assembly to impart reciprocatory stroking motion to one of said opposed frame means and accordingly to the filter material. The length and frequency of stroking motion is selected so as to provide parametric resonant vibration to the filter material through alternate relaxation and tension generated along the length of the material.

20 Claims, 11 Drawing Figures

COMPARISON OF TYPICAL FILTER
CLEANING AND LOADING

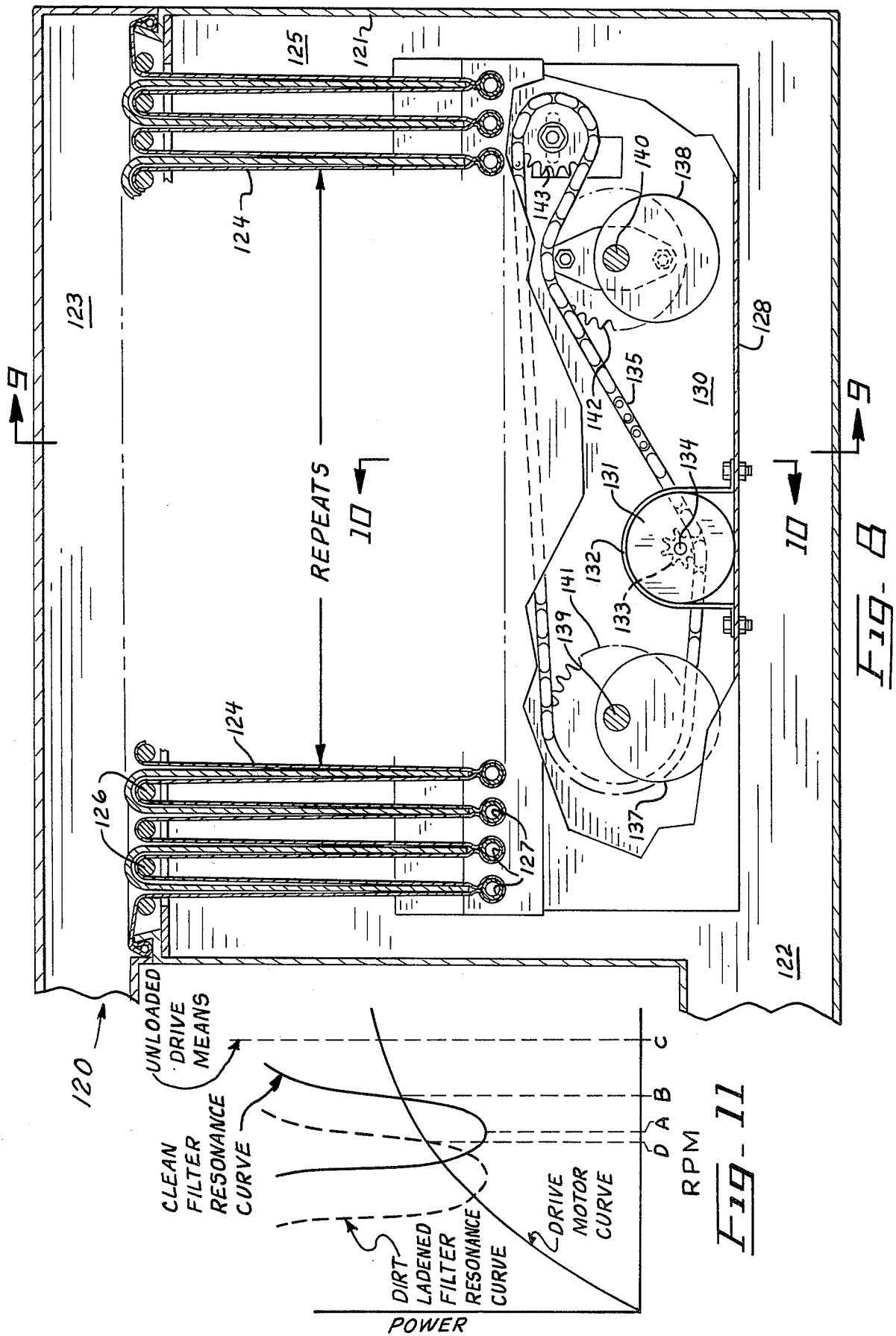

METHOD AND APPARATUS FOR CLEANING FILTER MEANS

BACKGROUND OF THE INVENTION

The present invention relates generally to an improved filter means to be utilized to remove particulate solids, such as dust particles from particle-laden or dust-laden air flow, and more specifically to a means for imparting shaking motion to a filter for controlled removal of particles from the surface thereof through parametric resonant vibration of the filter barrier material such as the filter bags which form the solids separation media for the filtering means.

In the treatment of dust-laden air, filter envelopes or bags are frequently employed and in operation, these envelopes or bags are normally between an inlet and an outlet plenum chamber of a plenum enclosure which, simply stated, forms the filter chamber. During use, the filters, the surfaces of which form the separation medium in the plenum become laden with solid undesirable particles such as dust, or solid valuable particles, such as may be produced in a manufacturing operation; these particles being periodically removed in order to reduce the pressure drop which builds up across the active surface of the filter medium. Inasmuch as a pressure differential is employed to move the dust or other particle-laden air through the filter chamber, build-up of solids on the filter medium surface will cause an increase in the pressure differential and consequent decrease in air flow. Depending upon the application, various adverse results can occur. For example, dust-cake build up in a floor sweeping machine results in an increase in filter pressure differential and consequent flow rate reduction in the normal dust controlling air flow. Drop in air flow, if unchecked, results in ultimate loss of dust control and the escape of dust around the machine and into the ambience.

As indicated, one common application of dust control apparatus is use in combination with a floor sweeping machine, such as a self-propelled or mobile power sweeping machine. These devices normally employ a vacuum or pressure source to establish a pressure differential for passing dust-laden air through the filter envelopes or bags so as to remove the dust from the air being transferred. Normally, means are provided to shake or vibrate the filter envelopes or bags so as to periodically remove the entrapped solid dust particles, thereby effectively cleaning the filters and reducing the back pressure across the filter elements. Other common applications for filter installations arranged to separate particulate solids from a stream of air include stationary applications such as found in a bag house or small stationary type filter arrangements, where separation of solid particulate matter from a gaseous stream is undertaken.

Floor sweeping systems employing filters are disclosed in detail in U.S. Pat. No. 3,233,274, dated Feb. 8, 1966, Merville O. Kroll, entitled "Sweeping Machine Dust Separator Apparatus", and U.S. Pat. No. 3,639,940, dated Feb. 8, 1972, Alfred D. Carlson and Joseph G. Kasper, entitled "Filter Chamber", both patents being assigned to Tennant Company, the same assignee as the present invention. In U.S. Pat. No. 3,639,940, a vibratory shaking mechanism for filter bags is disclosed. The present invention relates to a modified form of shaking mechanism for removal of dust from filter bags so as to achieve even more effective removal of the dust particles collected on the surface of the filter bags.

SUMMARY OF THE INVENTION

Briefly, in accordance with the present invention, means are provided for effectively shaking a filter means such as a filter bag, filter envelope, filter sock or other particle entrapping medium utilized for removal of solid entrained particles in a gaseous fluid by stroking the filter bag, envelope or sock at a frequency and under conditions of alternate tension and relaxation such that parametric excitation of the filter envelope or sock occurs. By way of broad definition, "parametric motion" refers to that certain relationship involving the dynamics of a certain time variant motion of a medium wherein motion of that medium is developed without the requirement of the usual forcing function. In relating this invention to one specific arrangement, the parametric excitation system of the present invention generates a standing or resonant half-wave along the length of a filter envelope which is being subjected to stroking motion treatment at one end thereof, with the direction of the reactive wave motion being at least partially in a direction perpendicular to the axis of the stroking motion, and with the stroking motion to which the filter materials are subjected being effective to optimally transmit mechanical energy or shaking motion essentially through the entire surface area of the filter material.

Parametric excitation of a filter envelope has been found effective in the removal of particulate solids from the entire surface of the filter envelope, even though shaking or stroking action is applied at only one end of the envelope, the other end being stationary. Normally, with conventional filter shaking operations, the stationary end of the filter tends to permit retention of a certain quantity of solid particles in the form of a cake which is only partially dislodged from the filter. For example, the stationary end of a filter may retain solid matter along a generally convex curve which has its base along the stationary edge and its greatest axial length along the center of the filter extending away from the stationary edge.

Filter bags and filter envelopes are in common use today. Normally, filter bags will be in the form of a cloth enclosure or the like, with a separator element interposed between the surfaces of the bag so as to provide physical separation of the two surfaces. These bags and separators are highly flexible, and possess sufficient flexure so as to be generally limp. Accordingly, these structures are capable of forming standing or resonant waves when stroked or otherwise set into motion by an appropriate excitation means.

Thus, in the present arrangement, the parametric excitation of a filter involves subjecting the filter to stroking action which will, in turn, generate standing or resonant waves in the filter element, these waves having a significant amplitude along an axis normal to the axis of the applied motion. Thus, when filter tension is altered substantially, and at an appropriate frequency or rate, then the filter is set into violent lateral vibration by parametric excitation. Thus, parametric excitation involves the generation of standing or resonant vibratory energy in the filter wherein the mode of vibration provides or generates an integer of half-wave lengths along the length of the filter. Normally, a standing wave of one-half wave length will deliver a substantial amount of vibratory energy throughout substantially the entire area of the filter. Such excitation achieves exceptional removal of solid particles or cake from the filter.

Therefore, it is a primary object of the present invention to provide an improved technique for cleaning of filter bags or envelopes suspended between opposed frame means, and wherein reciprocatory shaking motion is imparted to the filter elements so as to achieve parametric excitation of the filter bags or envelopes during cleaning.

It is yet a further object of the present invention to provide an improved system for the removal of solid particles from the surface of a filter wherein the filter element is cyclically subjected to stroking motion to achieve alternate relaxation and tension in the filter, the stroking motion being at a frequency or range of frequencies such that a standing or resonant wave is created on the filter along a plane generally transverse to the normal plane of the filter.

It is yet a further object of the present invention to provide an improved cleaning system for a filter system employed in combination with a mobile floor sweeping machine wherein the individual filter elements upon which solid particles are retained are subjected to stroking or reciprocating motion at a predetermined frequency or frequency range so as to generate a standing or resonant wave in the filter element being subjected to the stroking motion.

Other and further objects of the present invention will become apparent to those skilled in the art upon a study of the following specification, appended claims, and accompanying drawings.

BRIEF DESCRIPTION OF THE DRAWINGS

FIG. 8 is a front elevational view, partially broken away, of a further modified form of filter housing and filter shaking apparatus embodying the features of the present invention, with a portion of the filter housing and the filter shaking apparatus being broken away to expose the details of the mechanism;

FIG. 11 is a graph illustrating the performance of the structure illustrated in FIGS. 8–10, and illustrating the relationship of the power requirements of the motor and the filter mechanism versus rpm.

DESCRIPTION OF A FIRST PREFERRED EMBODIMENT

Figure 1:
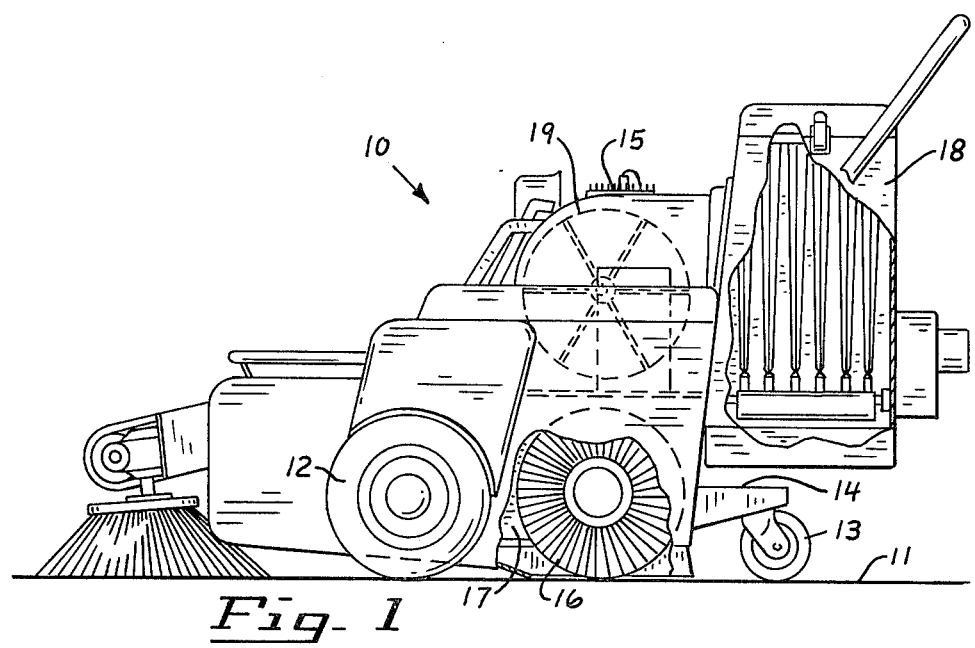
FIG. 1 is a side elevational view of a self-propelled floor sweeping machine having a filter shaking or cleaning arrangement provided in accordance with the present invention.

In order to disclose one preferred embodiment of the present invention, the actual working structure is illustrated in combination with a floor sweeping machine. As indicated previously, the filter cleaning arrangement utilizing parametric excitation may be applied to a variety of filter installations with the floor sweeping arrangement being one in which the structure has been found to have particular utility. Accordingly, with attention being directed to FIG. 1 of the drawings, the floor sweeping machine generally designated 10 is shown as it is disposed over the running surface 11, supported by forward drive wheels 12 and support casters 13, all of which are appropriately mounted onto a supporting chassis and frame 14. Chassis and frame 14 provides adequate support for each of the components in the self-propelled floor sweeping machine 10.

For a detailed discussion and description of the floor sweeping machine 10, reference is made to U.S. Pat. No. 3,233,274, cited hereinabove, it being understood that the apparatus disclosed in U.S. Pat. No. 3,233,274 is modified to the extent that the parametric excitation of the filter means is utilized in the filter cleaning arrangement of the device.

Briefly, however, power is supplied to the sweeper by a suitable source, such as an internal combustion engine 15, it being understood, of course, that alternate sources of power such as a battery or the like may be appropriately and suitably utilized. Output power of engine 15 may be coupled to the drive wheel or wheels 12 through any suitable linkage system. Engine 15 is also utilized for delivering power to rotary brush 16, with brush 16 being suitably mounted for rotation, as indicated, in a brush housing or compartment 17.

Normally, finely-divided particulate solids such as dust and dirt will also be raised by the sweeping action of brush 16, and will become entrained in the air surrounding the brush. The entrained particles are ultimately transferred to filter compartment 18 by means of a pressure differential established by impeller 19. This pressure differential is provided to create air flow from brush housing 17 to filter chamber 18. Air flow is needed to control the excitation of dust from the brush, with the air being carried from chamber 17, through impeller 19, and thence into filter chamber 18, as illustrated in FIG. 2.

Figure 2:
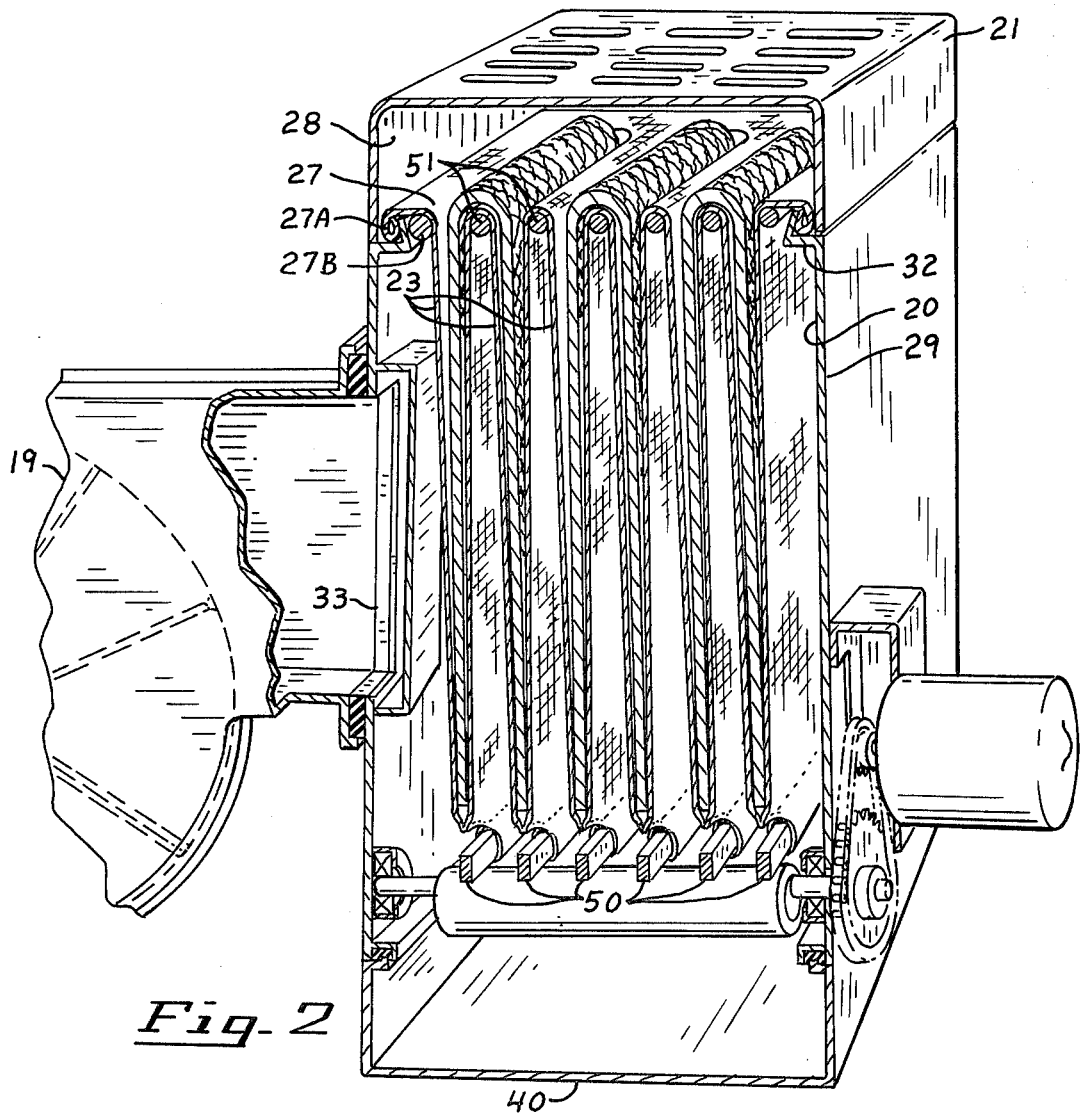
FIG. 2 is a perspective view, partially in section on an enlarged scale, illustrating the interior of the filter housing and plenum chamber, and also illustrating the apparatus utilized to parametrically excite the individual filter medium through stroking or shaking of the filters.

With particular attention now being directed to FIG. 2, filter compartment 18 includes a closed housing 20 having a removable cover 21, cover member 21 being releasably secured to the remaining portions of the filter compartment 18 for maintenance, servicing, and the like. The cover member 21 is provided with an opening to ambience, which opening may contain a filter member across the top surface thereof in order to provide additional or final filtration for air being transferred and moved through the device. The details of this filter compartment are also given in U.S. Pat. No.

3,233,274, as described above, and reference is made to that disclosure for the details of such a filter housing, it being understood that this application is simply one of many in which the shaker of the present invention utilizing parametric excitation of the filter means could be utilized. A plurality of independently suspended filter bags 23—23 are mounted in the interior of compartment 18. Filter bags 23 are relatively thin pockets made of a suitable woven material and are filled with a separator substance such as an open cell foam mat or other flexible filler element that keeps the relatively larger area cloth material side walls or surfaces of the filter bags spaced apart when the interior of these bags is subjected to a relatively lower pressure due to the pressure drop therethrough. As will be explained more fully hereinafter, the cloth material comprising the side walls of the filter bags 23 is a durable material, preferably polyester. The filter bags 23 are generally closed or otherwise seamed around their periphery except at the ends as shown at 27 where they communicate with a plenum chamber 28. Plenum chamber 28 is surrounded by edge members 27A made of cloth sewn to the filter bags, with these edge members and optional rod members 27B providing a sealed peripheral rim around the ends of the filter bags adjacent outer shell wall 29 of plenum chamber 28. A flanged framework 32, preferably fabricated of metal, forms a rectangular base extending inwardly from the inner surfaces of the wall member 29, and provides a sealing surface for the edges of the filters within the plenum chamber. Framework 32 is secured to the lateral wall 29. Air passing through the system must therefore move inwardly through baffled inlet 33 which is coupled directly to the discharge of impeller 19 and thence into the filter compartment, and outwardly through the filters as defined by the opening from the filter chamber into plenum chamber 28, the air thereby passing through the walls of the filter bags in order to enter plenum chamber 28. Clean air then flows outwardly through filtered opening of cover 21, the air having been cleaned of any entrained dirt particles or dust while passing through the filter elements.

Filter compartment 18 has a removable tray or pan 40 along the bottom that may be removed in order to discharge the dust deposited therein upon release from the individual filter bags.

The lower edge portions of the filter bags 23 are mounted onto transverse shaker rods 50—50, with each of these shaker rods extending across the entire transverse length of the filter bags 23. A similar plurality of rods are illustrated at the plenum end of the filter bags, as at 51—51. The individual transverse rods 50—50 are normally passed through openings formed in the filter bags for the receipt of these rods. The openings which are formed in the filter bags 23 may be provided with sewn seams or the like in order to provide additional sealing strength about these openings. The upper rods 51—51 are secured in place by a flanged frame member as shown at 52 (FIG. 4), while the lower rod members 50—50 are notched as at 53 (FIG. 4) to receive hold-down rods 54—54. In this manner, therefore, the upper and lower ends respectively of the filter bags are retained in a generally rectangular frame arrangement. Any suitable securing arrangement may be utilized for the individual frame members 52 within the chamber 18. The details of this attachment may be found in the above-referred to U.S. Pat. No. 3,639,940. Means are provided for applying tension to the bags such as a plurality of tension springs 56—56 which are provided at the base of the filter bags, and extend between transverse rods 54—54 and the base frame of chamber 18 through the eyelet formed in flange bracket 57—57. Since the means for applying tension to the bags will also be used to drive the bags downwardly on the return stroke, care is taken to provide appropriate acceleration force to the tensioning means. In certain instances, therefore, gravity may be employed as the return force, with gravitational tension being established by the use of weights. As provided in the illustrative embodiment herein, springs 56—56 provide the tensioning in filter bags 23, with the combination of the springs and the driving motion of the stroking mechanism (described hereinafter) providing alternate tensioning and relaxation in the filter bags.

Figure 3:
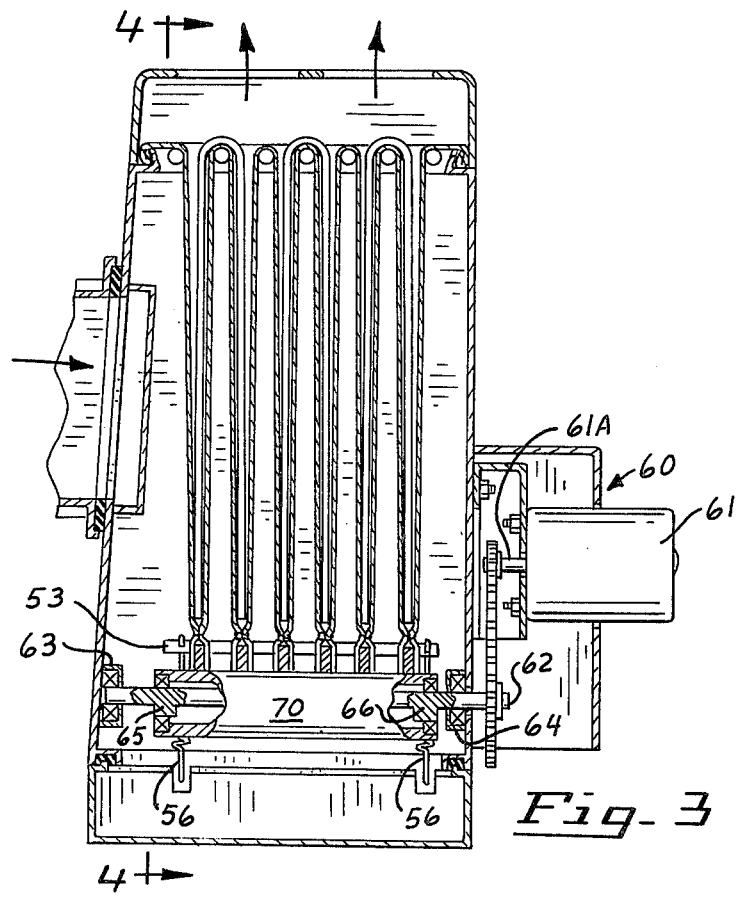
FIG. 3 is a vertical sectional view of that portion of the apparatus illustrated in FIG. 2 but on a slightly reduced scale from FIG. 2, and further illustrating the manner in which spring means are utilized to exert tension in the filter elements.
Figure 4:
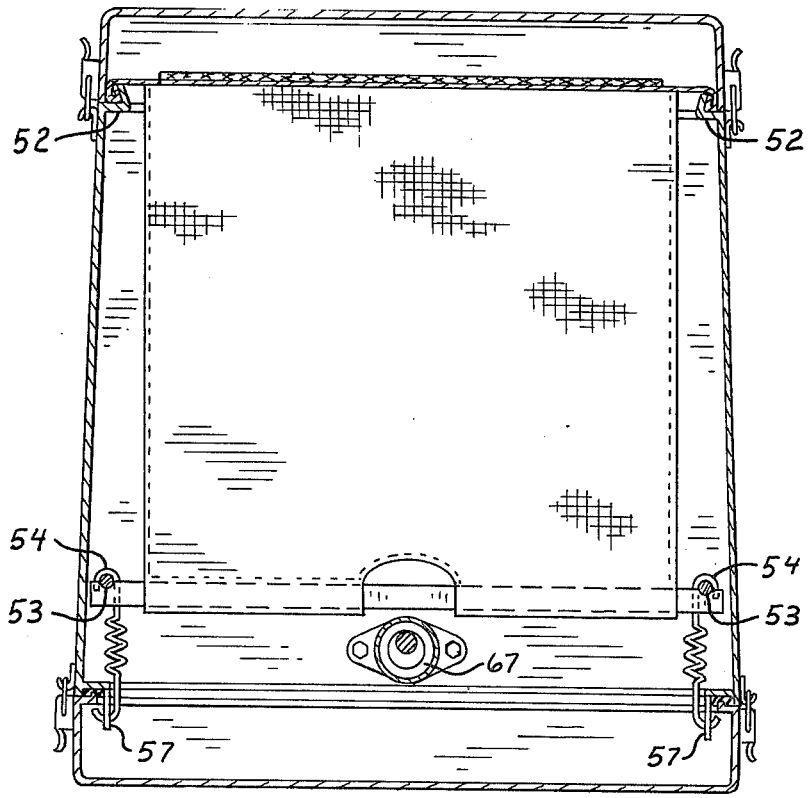
FIG. 4 is a vertical sectional view taken along the line and in the direction of the arrows 4—4 of FIG. 3.

The shaker mechanism for obtaining parametric excitation of the filter means is generally designated 60 and includes motor 61 having an output shaft 61A drivingly engaging shaft 62, shaft 62 extending through the walls of filter compartment 18, as best illustrated in FIGS. 2 and 3. Suitable journal bearings or bushings are provided at 63 and 64, in order to accommodate rotational motion of shaft 62. Shaft 62 has a pair of eccentric portions as at 65 and 66, with each of these eccentric portions being held within a cam bearing such as at 67—67 (FIG. 4). Seals are arranged, as appropriate, for each of the cam bearings 67—67. The outer race of cam bearings 67—67 are each held in place within the inner diameter of or within counterbores at opposed ends of cylindrical element or cylindrical cam 70, the upper surface of cam 70 being in running contact with the lower edges of rods 50—50. Accordingly, rotation of shaft 62 will provide shaking motion for the individual filter bags 23, with the speed of rotation determining the frequency of the shaking, and the amplitude being determined by the degree of eccentricity of eccentric portions of cam lobes 65 and 66. The frequency of shaking is controlled by any suitable means, such as a chain and sprocket drive or other standard speed control, as illustrated. Such an arrangement provides for shaking at a frequency within the desirable ranges to be described hereinbelow. With spring forces providing the return stroke for the shaking mechanism, there may, in certain instances, be a finite period of time during the return portion of the cam cycle during which the cam surface is free of contact with the cam followers.

While a cam mechanism has been illustrated for providing a drive on the stroking means, it will be appreciated that alternate stroking mechanisms are available. For example, a reciprocatory drive may be obtained with the use of a periodically fired solenoid, as well as from an eccentric weight being provided on a rotating shaft, with guides or slides being provided to control the reciprocatory nature of the resulting output motion. Motor 61 may be either electrically or hydraulically powered to accommodate different power arrangements, as may be indicated for the specific application. Also, in lieu of springs, other force-applying means may be provided, such as a suspended weight or the like as will be more fully explained in the description of an alternate preferred embodiment.

The pressure differential required in the system to achieve air flow is accomplished by impeller generally designated 19, with the impeller having a conventional rotor element. The impeller 19 is merely interposed between brush chamber 17 and filter chamber 18. Therefore, the brush chamber 17 operates at a modest vacuum, while that portion of the interior of filter chamber 18 exposed to the inlet operates at a modest superpressure.

Figure 6:
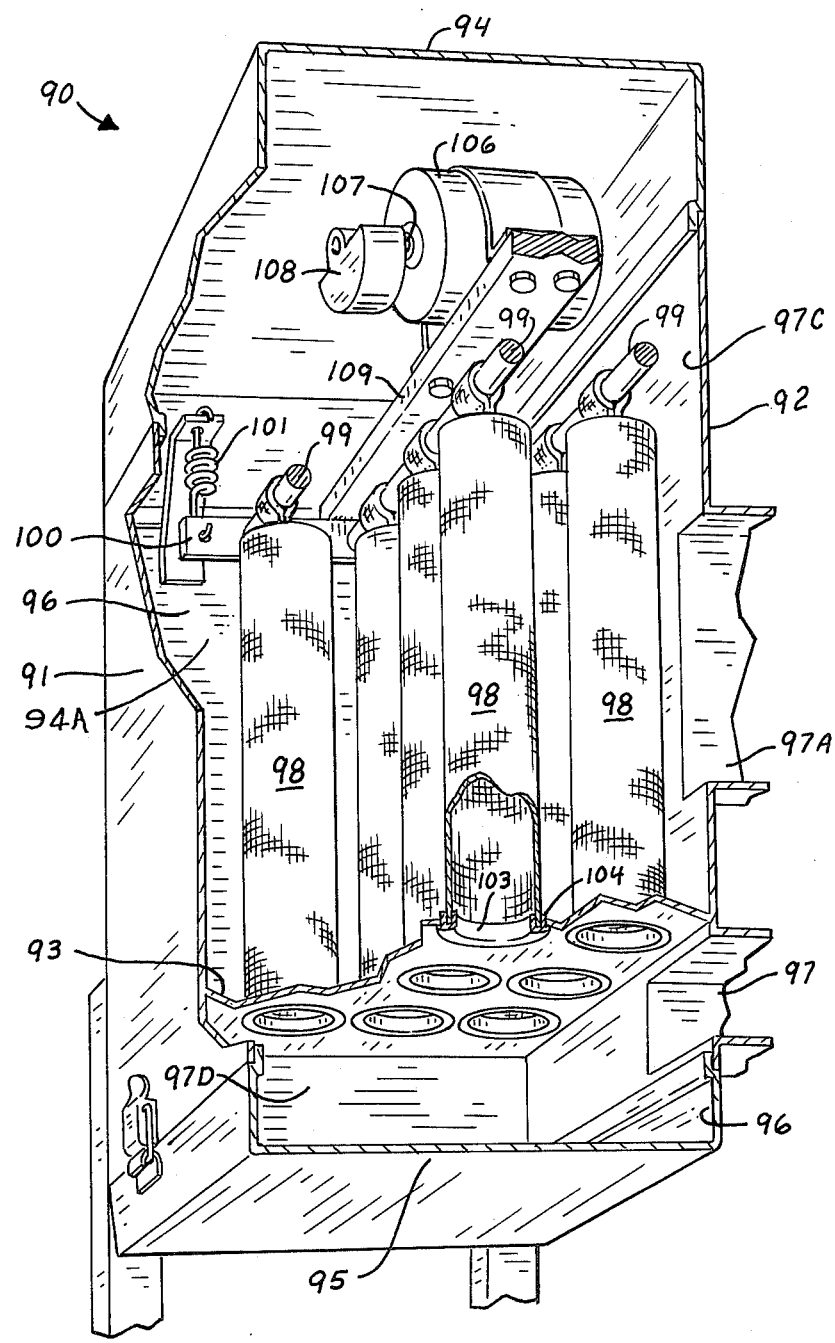
FIG. 6 is a perspective view of a modified form of filter housing and related apparatus embodying the present invention, with a portion of the housing being broken away to expose the features of the filter apparatus.

Attention is now directed to FIG. 6 of the drawings wherein a modified form of filter installation is illustrated. Specifically, the filter means generally designated 90 includes a housing which includes side walls 91 and 92, together with a top closure wall 94. Base wall 95 is provided at the bottom of the unit with short side walls forming a removable open top box or the like, as at 96. As indicated, base wall 95 is removably secured to the side walls, with inlet 97 comprising, in this instance, a duct extending from or communicating with a dust controlled zone. A pair of opposed side walls complete the enclosure, such as wall 94A and an oppositely disposed side wall (not shown). An outlet from chamber 92 is provided at 97A. Thus, an enclosed filter chamber is disposed at 97C, with filter mounting plate 93 separating filter chamber 97C from inlet plenum chamber 97D. Between plate 93 and top closure wall 94, a clean air plenum chamber is provided, which receives exhausted filtered air upon passing through the individual pores or perforations of the plurality of individual filter socks 98—98, the open base portions of which are sealably secured or engaged with the openings formed in plate 93, and the closed opposed end portions of which are secured to a plurality of rods 99—99 forming a shaker frame, each rod 99 being secured at its opposed ends to a frame member such as frame 100, and held under tension introduced by a plurality of corner mounted tension members such as spring member 101.

In order to provide tension in the individual filter socks, a frame member 100 is provided as one of a pair of such members along with plate 93, plate 93 supporting a plurality of individual annular flanges 103—103, each of which is utilized to anchor one end of a filter sock to the plate 93. A cooperating annular clamping ring member 104 is utilized to grippingly engage the open end of filter sock 98 about the outer diameter of flange 103. Motor 106 is provided, preferably electrically powered, with the output shaft 107 of motor 106 carrying eccentric weight unit 108. Rotation of shaft 107 of motor 106, therefore, provides reciprocatory motion of the motor mounting base 109, the mounting base being in turn, suspended between frame member 100 and its opposed mating frame member (not shown) to which the opposite end of each of the rods 99 is secured, frame member 100 along with its mate providing a support base or pad for motor mount 109. This eccentric oscillating motion is, in each instance, translated to reciprocatory motion having a substantial component of up-and-down motion directed generally parallel to the elongated axis of the individual filter socks 98—98, with appropriate guides, not shown, being provided to limit the motion along a vertical axis.

In order to clean the accumulated filter cake which is discharged from the interior of the filter socks 98—98, a removably replaceable tray or receptacle is provided in the form of box 96, which may be removed from the filter assembly when a sufficient charge or filter cake or debris has been received from the cleaning operations of the individual filter socks 98—98.

In order to remove any accumulation from the interior surfaces of the individual filter socks 98—98, motor 106 is energized and eccentric weight 108 provides reciprocatory motion in member 100, thereby increasing the tension in spring members 101—101, and permitting the individual filter socks to become slack. Inasmuch as ample tension is provided on the shocks 98—98, the release of tension therefrom provides a reaction in the filter socks which translates into motion in the socks along a plane perpendicular to the plane of stroking motion derived from motor 106. Thus, shaking of the filter socks is achieved in the individual filter socks 98—98 by virtue of stroking the frame member 100 at a frequency calculated to provide parametric excitation in the individual filter socks 98—98.

It will be further noted that the device utilizes a means for establishing air flow therethrough. Thus, along inlet 97, the pressure in the system is at a level of $P_1$, and with the pressure drop encountered across the surfaces of the individual filter socks 98—98, the pressure at the outlet is substantially $P_1 - \Delta P$. As filter cake builds up on the inner surfaces of the individual filter socks 98—98, therefore, the magnitude of $\Delta P$ increases accordingly. Upon reaching a sufficiently high level of $\Delta P$, motor 106 is actuated so as to subject the individual filter socks 98—98 to parametric excitation, and thus discharge filter cake into box 96.

PARAMETRIC EXCITATION

Figure 5:
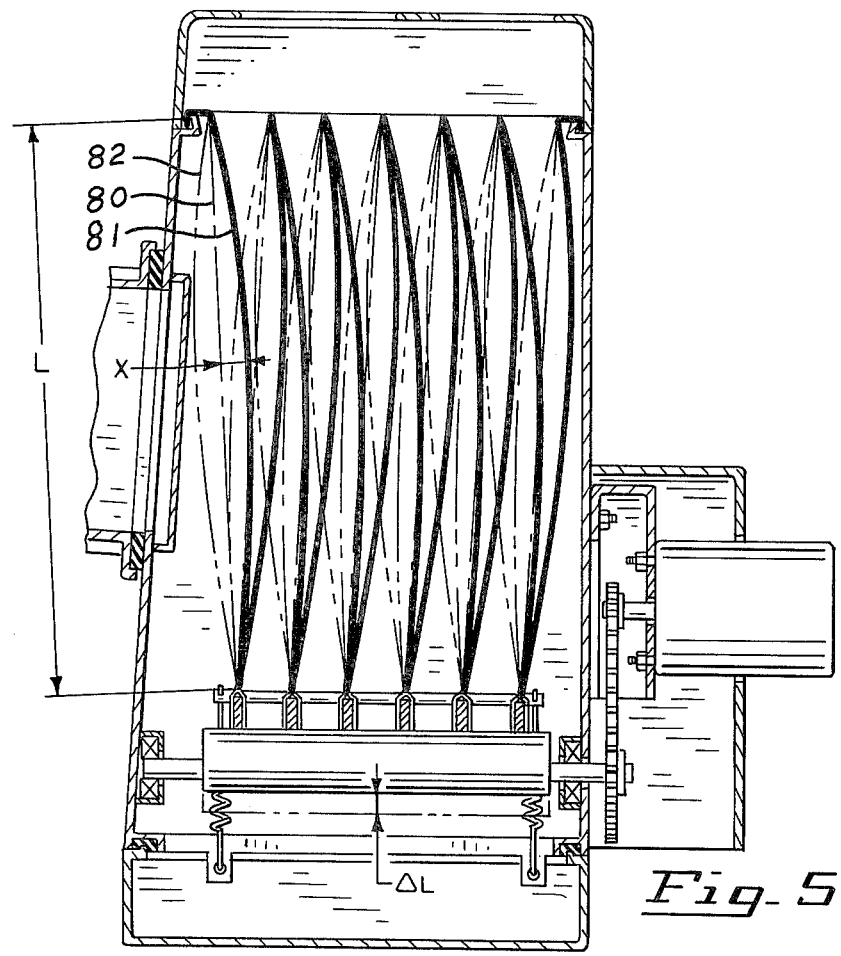
FIG. 5 is a view similar to FIG. 3 on a slightly enlarged scale, with portions of the mechanism being shown in elevation for purposes of clarity, and schematically illustrating the mode of vibration of the filter elements during the parametric excitation thereof.

As has been indicated hereinabove, optimum cleaning of the individual filter bags is obtained when a standing half-wave of vibratory motion (or integral multiple thereof) is generated on the filter envelope per se. Half-wave motion has been found highly effective in transmitting shaking energy across the entire surface of the envelope, including those areas of the envelope immediately adjacent the stationary support end. This type of motion in a filter envelope is achieved through parametric excitation. It is this type of excitation which induces vibratory motion along the entire length of the filter envelope so as to dislodge, remove, and otherwise release solid particles from the surfaces of the individual filter elements. In order to achieve standing wave motion through parametric excitation, the excitation provides in the filter elements an integral number of one-half wave lengths, with the filters being cyclically tensioned and relaxed. Thus, the resultant mode of motion achieved through parametric excitation travels at least partially in a plane generally transverse to the axis of the filter elements, and likewise transverse to the direction of applied motion. The extent of relaxation of the filter bag or envelope is sufficient so as to achieve significant motion of the envelope in a plane which is transverse to the plane of the envelope. This motion is illustrated schematically in FIG. 5, wherein the straight or planar lines 80 represent the normal plane of the filter, with lateral lines such as solid line 81 and phantom line 82 indicating the disposition of the filter during release of tension or "relaxation" during shaking. The parameters involved in achieving parametric excitation are to be found hereinbelow.

(A) GENERAL PARAMETER CONSIDERATIONS

Filter cleaning utilizing parametric excitation may be accomplished on filters of a variety of sizes. The general equation relevant to parametric excitation is as follows:

The frequency at which to tension and slacken any filter element is obtained from $$F = C \left( \frac{T \max}{W} \right)^{\frac{1}{2}}$$

wherein:
F is frequency in RPM
T max is maximum tension per filter envelope (lbs.)
W is weight of one envelope and separator (lbs.); and
C is an experimentally determined constant. The parametric constant for envelope type filters is determined to be as follows:

$$C \cong 6B + 80$$

wherein:
C is a constant in RPM; and
B is the filter depth in inches.

The acceleration developed at any point on the filter envelope can be determined from the following equation:

$$A = D \omega^2 \sin \omega t$$

wherein:
A is the acceleration;
D is the amplitude of the wave; and $\omega$ is the wave velocity measured in radians per second. D, the amplitude of the wave, may be approximated by the following equation:

$$D = \frac{(L - \Delta L) \left( \frac{L}{L - \Delta L} - 1 \right)^n}{K}$$

wherein:
L is the filter length in inches;
$\Delta L$ equals lift or slackening of filter envelope by stroking means in inches;
K is a constant having a value of about 1.65; and
n is an exponent having a value of about 0.4978. The values of "K" and "n" have been determined empirically, and are considered valid for those cases wherein the lateral deflection of the filter ("X" in FIG. 5) does not exceed the value of $(L - \Delta L)/2$. Therefore, this data is considered appropriate for establishing approximate design parameters for an exceptionally wide variety of filter envelope structures.

(B) EXCITATION OR INPUT FREQUENCY

With the stroking mechanism in the form of a cam lifting arrangement, a repeatable wave input is provided and the response wave frequency of the envelope will be at one-half of the input frequency, as expected with parametric excitation. It has been found that parametric excitation may be achieved with a reasonably wide range of input frequencies to provide the desirable output response on the envelope. This occurs inasmuch as the resonant response frequency is the preferred frequency of vibration for the envelope. Normally, frequency range is determined by tension, filter envelope shape factor, acceleration desired on the filter, and weight of filter and separator.

1. Tension and Frequency — With increasing tension, and frequency band is normally raised, with the band width remaining constant. It will be appreciated that a higher frequency increases acceleration on the filter envelope and ultimate filter envelope response. Higher accelerations on the filter material will normally enhance the cleaning of the elements.

2. Input Displacement — The stroking element such as the cam is preferably designed to provide reasonable displacement inasmuch as modest or small displacements normally cannot excite the system to resonance, due to filter manufacturing tolerances. After a reasonable displacement value is achieved, additional displacement amplitudes determine the amplitude of the wave on the filter envelope. It will be appreciated that greater displacement increases acceleration on the filter envelope and ultimate filter response. A reasonable displacement value is required from the standpoint of accommodating manufacturing tolerances in filter length. Thus, in order to achieve tension release on all filters, the amplitude is calculated to be sufficient to accommodate the largest filter manufacturing tolerance expected.

3. Damping — The mass of the filter envelope, its separator element, and to a lesser extent dust or dirt accumulation provides damping in the structure. Therefore, normal dust loading on filters will not significantly alter the frequency, displacement, or tension required in order to achieve overall correct response for cleaning. It has been found that even heavily loaded filter envelopes, after exposure to shaking, will ultimately achieve or undergo parametric excitation and thereafter unload trapped dust and dirt rapidly, with dust loading then becoming even more significant.

4. Shape Factor — The depth dimension of the filter envelope determines the constant to use to calculate the optimum or mid-point of the input frequency band. This constant is set forth in the equations set forth hereinabove. For most filters having length-to-depth ratios ranging from between about one-half and up to about 2, the constant set forth above will be reasonably valid.

Figure 7:
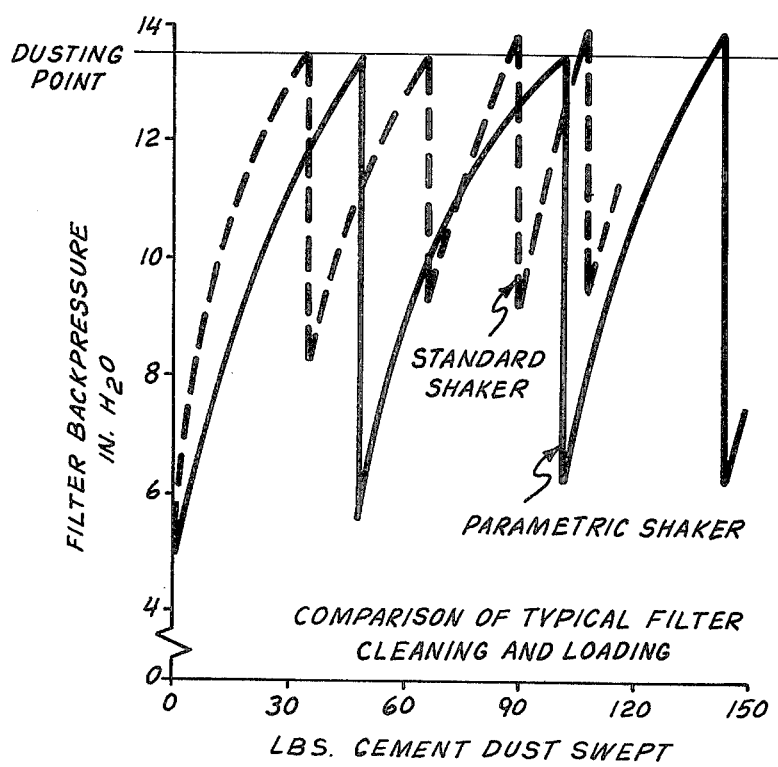
FIG. 7 is a graph illustrating the performance of a standard shaker system as compared to the parametric excitation achieved with the present invention.

Attention is now directed to FIG. 7 of the drawings wherein a comparison is given between standard filter shaking and parametric excitation of filters. It will be readily apparent that the preferred result is achieved with parametric excitation, with dust and dirt captured on the filter envelope during operation being systematically and consistently substantially entirely removed when parametric excitation is involved. It will be observed that the filter element identified as being treated by exposure to parametric excitation takes a longer period of time to reach the dusting point and appears capable of receiving and accepting a larger charge of solid particles. This is believed due to the introduction of substantially constant tension in the filter elements during periods of use.

Therefore, the use of parametric excitation for filter cleaning will tend to substantially lengthen, and in certain instances, eliminate filter removal for cleaning by air or washing in water or other fluids. A clean filter can, of course, contribute to lower fan capacity requirements, thereby resulting in lower horespower and power requirements for the sweeper system.

With continued attention being directed to FIG. 7, these results are empirical results obtained from a standard floor sweeper of a type identified as Model 42, Tennant Company, Minneapolis, Minnesota. These typical results indicate that with parametric excitation, the apparatus may be run for a longer period of time and collect a greater quantity of solids than with the use of standard filter shaking techniques. The dusting point for the apparatus is not reached until a significantly longer period of use has transpired subsequent to each filter shaking operation.

DESCRIPTION OF A SECOND PREFERRED EMBODIMENT

Figure 9:
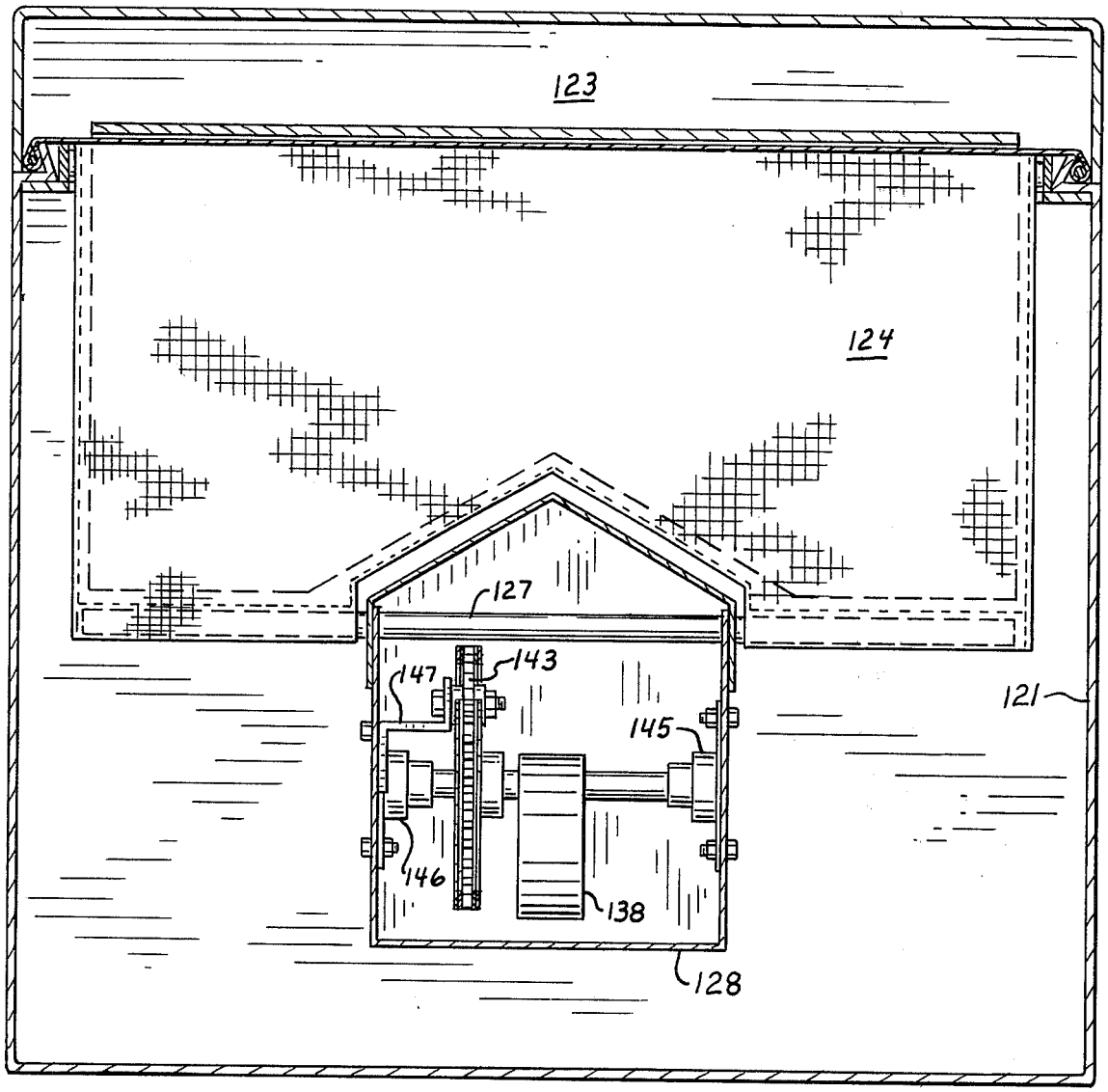
FIGS. 9 and 10 are vertical sectional views taken along the lines and in the direction of the arrows 9—9 and 10—10 respectively of FIG. 8.
Figure 10:
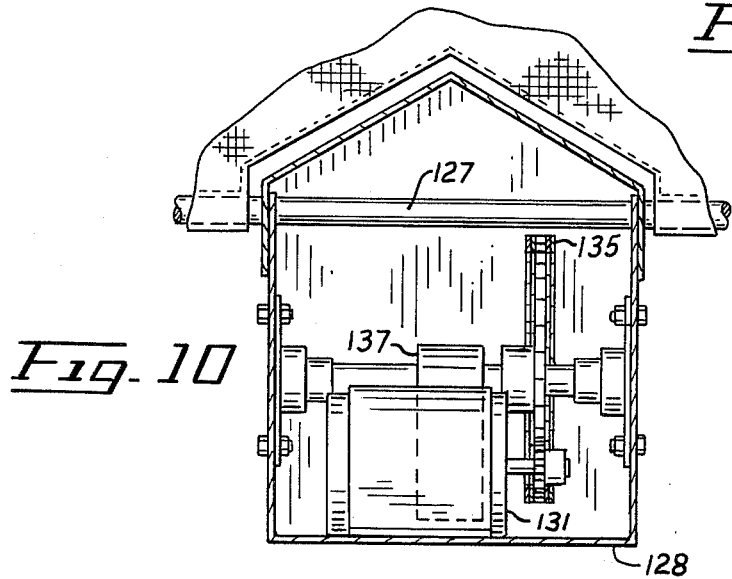

Attention is now directed to FIGS. 8-10 inclusive wherein a second preferred embodiment is illustrated. This embodiment differs from those embodiments of FIGS. 1-6 in that stroking motion is applied to the filters by means of a motor means driving eccentric weights, with the motor means and the weights being supported by and freely suspended from the base of the individual filter elements. The force required for the stroking motion is applied by virtue of the rotating eccentric weights, and the return force for the filter bags is obtained by the gravitational force of the freely suspended and totally enclosed stroking mechanism.

Attention is now directed to FIGS. 8 and 9 of the drawings wherein the filter system generally designated 120 is shown confined within a chamber or housing 121, the housing having an inlet as at 122 and an outlet plenum chamber as at 123. Individual filter elements such as at 124—124 are suspended throughout the length of chamber 125 which is defined within a portion of housing 121. The individual filters 124—124 are suspended at the upper ends by transverse rods or tubes 126—126, and at the lower ends by individual rods or tubes 127—127. The base rods or tubes 127—127 are secured to the upper portion of housing 128, as more clearly illustrated in FIG. 9, and the suspended weight of chamber 128 provides the tension required in the group of filter elements 124—124.

As can be appreciated, the individual filters 124—124 are of a commercially available variety and are widely used in industry. This feature of the present invention constitutes an effective and economical means for cleaning these individual filters 124—124 as cleaning requirements arise.

With attention being continued to be directed to FIGS. 8 and 9, and with additional attention being directed to FIG. 10, it will be observed that enclosure 128 encloses the shaking apparatus shown generally at 130 which is capable of parametric excitation. This shaking apparatus, as indicated, utilizes a pair of rotating eccentric weights, with the rotating weights and the driving means therefore deemed freely suspended from the base of the individual filter elements 124—124. The shaking apparatus includes motor means 131 secured by means of bracket 132 to the base of enclosure 128. Motor 131 is provided with a sprocket 133 on the output shaft 134 for driving endless chain 135 throughout its defined path. A pair of eccentric weights are shown as at 137 and 138, with these weights being arranged for opposed rotation about shafts 139 and 140, with these weights being, of course, appropriately keyed or otherwise rendered fast unto shafts 139 and 140. Rotational motion for the shafts 139 and 140 is provided by driven sprockets 141 and 142 respectively, with the opposed directional rotation being achieved by virtue of idler sprocket 143. Also, as is apparent in FIG. 9, bearing means are provided as at 145 and 146, with idler 143 being suitably provided with a mounting bracket and journal means as is illustrated in FIG. 9, the bracket mounting being designated 147.

To provide an effective source of power for the mechanism illustrated in FIGS. 8-10, motor 131 is generally matched closely to the load requirements in order that the power requirement for the motor 131 will be such that the maximum rpm reached will, during initial shaking, be at a resonance point for the loaded filters. The rpm will be permitted to increase as the resonance frequency increases so that cleaning will be effectively accomplished. Thus, it is important that the power source not be over-designed for the effort, in order to achieve desired operation at resonance during shaking.

Attention is now directed to FIG. 1 of the drawings wherein the response curve of the motor drive and the resonance curves for the filters are superimposed. The design speed for the motor at a load determined by the clean filter resonance is shown at "A" on the curve, with "A" representing a predetermined rpm. In actual running, the speed will ultimately reach an rpm represented by "B" on the curve. The unloaded drive rpm is represented by the "C", with this rpm being, of course, readily available from the motor source being utilized.

In actual operation, the dirt ladened filter coupled to the motor drive will be subject to parametric excitation shaken at a frequency determined by "D" rpm, and as the filter becomes partially cleaned, the rpm will increase until "B" rpm is reached upon achieving substantially cleaned filter surfaces.

In an actual installation, a total of 32 filter elements 124—124 where provided, with each filter element having a total of 16 square feet of surface. The static loading provided for the filters by virtue of enclosure 128 totaled 55 pounds. Motor 131 was selected as a 12-volt DC motor having a no-load speed of 2050 rpm. This motor delivered 68 ounce-inches of torque at 1225 rpm. The horsepower reading of the motor was ⅛ horsepower at 10 amps power, with 26.4 amps being drawn in locked rotor shaft configuration.

The overall size of chamber defined by housing 121 is 4' × 4' × 2' deep. As is apparent in the illustration of FIG. 8, the individual counter rotating weights 137 and 138 are disposed as close to the ends of the structure as is possible, thus achieving generally equally distributed loading on the individual bags.

GENERAL CONSIDERATIONS

While it has been indicated that a polyester material is preferable for fabrication of the limp filter envelopes other synthetic substances or natural occurring substances, may be utilized. For example, synthetics such as nylon, polyolefin substances such as polyethylene or polypropylene, or polytetrafluoroethylene (Teflon) may be utilized. Natural occurring substances, such as cotton, wool, reinforced paper, and filter envelopes fabricated from metallic filaments or fibers may also be used. Either weaves or felted materials may be used. Blends of materials such as polyester and stainless steel may also be found useful. While filter envelopes are normally woven, spun-bonded synthetic fibers such as felted polyester materials may also be utilized. The structure is arranged such that solid material collected will normally remain essentially on the surface as a cake. In this manner, the cake may be dislodged when appropriate and the filter substance restored to its original condition.

While the filter mounting and shaking arrangement is illustrated herein in combination with a self-propelled floor sweeping structure, it will be appreciated that the filter cleaning arrangement may be utilized in any filter arrangement wherein dust, debris, dirt or other solid particles are collected prior to discharge into ambient. Thus, the utilization in combination with a self-propelled mobile floor sweeping machine is being set forth herein as a typical application, and for purposes of comprehending the various aspects of the present invention.

As previously indicated, either stationary or movable installations may be equipped with the filter mounting and shaking arrangement of the present invention, and the solids to be removed may be either of the type to be properly disposed of, or of the type to be received and retained as a by-product with value.

I claim:

1. In dust control apparatus having dust transporting means and including means operatively connected to differential pressure generating means for establishing air flow therethrough; filter means interposed to filter said air flow, the improvement comprising:
   a. housing means having opposed filter support means mountably retaining said filter means in a tensioned relationship therebetween, a first port formed in said housing means and defining an air inlet thereto, and a plenum chamber within said housing means in communication with the clean air side of said filter means and a second port formed in said housing means defining a clean air outlet from said plenum chamber, said differential pressure generating means establishing air flow from said inlet, across said filter means and through said plenumchamber to said outlet;
   b. said filter means comprising at least one filter element with said at least one filter element being a generally flexible structure having a longitudinal axis and with a surface thereof being disposed within said plenum chamber;
   c. shaker frame means, and means coupling said shaker frame to one end of said at least one filter element in a direction generally along the longitudinal axis of said at least one element;
   d. stroking means operatively coupled to said shaker frame means for imparting reciprocatory stroking motion to said shaker frame with a component of said stroking motion being generally along the longitudinal axis of said at least one filter element, the stroke length of said stroking means being sufficient to move said shaker frame means toward said filter support means a distance to impart alternate tension and relaxation in said at least one filter element, said stroking means providing stroking motion to said at least one filter element at a frequency selected such that standing wave motion is generated in said at least one filter element with said standing wave being an integral number of one-half wave lengths along the length thereof and with motion in said at least one filter element being at least partially along an axis normal to said longitudinal axis.

2. The dust control apparatus as defined in claim 1 wherein said at least one filter element is fabricated from fibers selected from the group consisting of cotton, polyester, nylon, and polytetrafluoroethylene.

3. The dust control apparatus as defined in claim 2 wherein said at least one filter element is fabricated from fibers consisting essentially of woven cotton.

4. The dust control apparatus as defined in claim 2 wherein said at least one filter element is fabricated from fibers consisting essentially of woven polyester.

5. The dust control apparatus as defined in claim 1 wherein said means establishing a flow of air from said inlet through said housing means to said outlet is a blower disposed on the inlet side of said differential pressure generating means which provides a flow of air therethrough with the pressure drop being generated across said at least one filter element.

6. The dust control apparatus as defined in claim 1 wherein said stroking means comprises cam means.

7. The dust control apparatus as defined in claim 6 further comprising control means which are provided for controllably actuating said cam means at a predetermined rate of rotation.

8. The dust control apparatus as defined in claim 6 wherein said shaker frame means is a cam follower for said cam means.

9. The dust control apparatus as defined in claim 6 wherein said filter support means includes spring means coupling said shaker frame means to said housing means.

10. The dust control apparatus as defined in claim 9 wherein said stroking means provides a stroke length sufficient to permit said spring means to exert tension upon said at least one filter element during a portion of each stroking cycle.

11. The dust control apparatus as defined in claim 1 wherein said stroking means comprises an eccentrically mounted weight disposed fast upon a rotatable shaft, and means are provided for imparting rotational motion to said rotatable shaft.

12. The dust control apparatus as defined in claim 1 wherein said stroking means comprises a pair of eccentrically mounted weights each being disposed fast upon spaced apart rotatable shafts, and wherein means are provided for imparting rotational motion in opposed directions to each of said rotatable shafts.

13. The dust control apparatus as defined in claim 12 wherein said stroking means further comprises motor means for driving said rotatable shafts, and additional housing means provides an enclosure for said motor means and said eccentrically mounted weights, and wherein said additional housing means is suspended from the base of said at least one filtered element.

14. The dust control apparatus as defined in claim 13 wherein said rotatable shafts for said eccentrically mounted weights are disposed in spaced apart relationship, one to the other, at opposed ends of said enclosure.

15. The dust control apparatus as defined in claim 1 wherein said dust control apparatus is a wheeled self-propelled floor sweeper, having a chassis and frame.

16. The dust control apparatus as defined in claim 1 wherein said dust transporting means comprises an exhaust duct in a lower portion of said apparatus.

17. A method of removing filter cake from the surface of flexible filter element wherein said flexible filter element is retained between a pair of opposed relatively movable mounts, and wherein said filter element has an elongated axis extending between said relatively movable mounts, said method comprising:
   a. establishing a tension force across said filter element along said elongated axis thereof;
   b. stroking at least one of said relatively movable mounts at a predetermined amplitude and at a predetermined frequency;
   c. said predetermined amplitude being sufficient to impart intermittent periods of relaxation in said filter element, and relieve said tension force; and
   d. said predetermined frequency being selected to provide a frequency such that standing wave motion is generated in said filter element with said standing wave being an integral number of one-half wave lingths along the length thereof and with motion in said filter element being at least partially along an axis normal to said elongated axis in the alternate periods of relaxation and tension induced along the longitudinal axis of said filter element.

18. The method as defined in claim 17 wherein said predetermined frequency and predetermined amplitude are selected to provide alternate finite time periods of tension and finite time periods of relaxation in said filter element.

19. The method as defined in claim 17 wherein the band width of said predetermined frequency is substantially constant.

20. The method as defined in claim 17 wherein said predetermined frequency is dependent upon the degree of solid loading of said filter element being claimed.

* * * * *

UNITED STATES PATENT OFFICE
CERTIFICATE OF CORRECTION

PATENT NO. : 4,032,307
DATED : June 28, 1977
INVENTOR(S) : George L. Sommerfeld

It is certified that error appears in the above-identified patent and that said Letters Patent are hereby corrected as shown below:

Column 2, line 28, "through" should read -- throughout --.

Column 7, line 63, "or" (first occurrence) should read -- of --.

Column 8, line 4, "shocks" should read -- socks --.

Column 9, line 65, "and" should read -- the --.

Column 12, line 9, "FIG. 1" should read -- FIG. 11 --. Line 10, "25" should be deleted.

Column 14, line 37, "provides" should read -- providing --. Line 53, after the word "of" insert -- a --.

Signed and Sealed this

Twenty-seventh Day of September 1977

[SEAL]

Attest:

RUTH C. MASON
Attesting Officer

LUTRELLE F. PARKER
Acting Commissioner of Patents and Trademarks